(12) United States Patent  
Minden et al.

(10) Patent No.: US 7,006,537 B2
(45) Date of Patent: Feb. 28, 2006

(54) SINGLE POLARIZATION FIBER LASER

(75) Inventors: Monica Minden, Calabasas, CA (US); Dmitry Starodubov, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/924,957

(22) Filed: Aug. 7, 2001

(65) Prior Publication Data

US 2003/0123494 A1 Jul. 3, 2003

(51) Int. Cl.
*H01S 3/30* (2006.01)
*H01S 3/10* (2006.01)
*H01S 3/08* (2006.01)

(52) U.S. Cl. ............................ 372/6; 372/27; 372/102
(58) Field of Classification Search ............... 372/6, 372/43, 102, 27, 19, 94, 29.01
See application file for complete search history.

(56) References Cited

U.S. PATENT DOCUMENTS

| 5,031,993 | A | * | 7/1991 | Asthana et al. ............ 385/37 |
| 5,056,888 | A | * | 10/1991 | Messerly et al. .......... 385/123 |
| 5,166,940 | A | * | 11/1992 | Tumminelli et al. ........... 372/6 |
| 5,243,609 | A | * | 9/1993 | Huber ...................... 372/19 |
| 5,327,515 | A | * | 7/1994 | Anderson et al. .......... 385/123 |
| 5,511,083 | A | * | 4/1996 | D'Amato et al. ............. 372/6 |
| 5,745,617 | A | * | 4/1998 | Starodubov et al. ......... 385/37 |
| 5,881,188 | A |   | 3/1999 | Starodubov |
| 6,072,811 | A | * | 6/2000 | Fermann et al. ............ 372/11 |
| 6,272,165 | B1 | * | 8/2001 | Stepanov et al. ........... 372/94 |
| 6,344,298 | B1 | * | 2/2002 | Stardubov ................... 430/5 |

* cited by examiner

Primary Examiner—Minsun Oh Harvey
Assistant Examiner—Armando Rodriguez
(74) Attorney, Agent, or Firm—Tope-McKay & Associates

(57) ABSTRACT

A method and apparatus for generating single polarization fiber laser output are disclosed. A Bragg grating is nondestructively fabricated within the fiber to introduce differential loss between the two polarizations of the laser output. Curvature at the grating site into a tight loop further increases the differential loss between the available polarizations.

24 Claims, 3 Drawing Sheets

SINGLE POLARIZATION FIBER LASER

FIELD OF THE INVENTION

The present invention relates to a method and apparatus for obtaining electromagnetic radiation having a single polarization from a fiber laser.

BACKGROUND OF THE INVENTION

Fiber optic lasers naturally oscillate in both available electromagnetic radiation polarizations. However, single polarization laser output is required in a large proportion of laser systems. Components that use polarized electromagnetic radiation include heterodyne detectors, most modulators, frequency doublers and shifters, and many amplifiers. Thus, the ability to generate single polarization fiber laser output is critical to most applications for fiber laser technology, including but certainly not limited to laser communications, laser radar for military and automotive applications, and active imaging systems. However, presently, no suitable method exists for polarizing fiber laser output that does not incur splicing losses between dissimilar fibers or require high-risk, labor-intensive fabrication steps A number of techniques have been proposed and/or demonstrated for making a fiber laser oscillate in only one polarization. One such method requires splicing single polarization fiber onto the doped fiber. However, presently available single polarization fibers do not match the parameters of the doped fibers used for the laser gain; numerical aperture and core diameter, for example, are considerably different. Thus, the internal splice between the dissimilar fibers creates undesired loss.

In another technique the doped fiber is polished to its core and then metallic or waveguided loss of one of the polarizations is introduced into the fiber. However, this approach is labor-intensive and not cost-effective, and such techniques present a high risk of breaking the fiber laser.

Another proposed technique, though never successfully demonstrated, is to use the natural birefringence of a fiber grating by using two fiber segments spliced back together after rotating one segment by 90°. However, this proposed technique is labor-intensive, is not cost-effective, and presents a high risk of fiber breakage.

SUMMARY OF THE INVENTION

The present invention provides a method and apparatus for achieving single polarization output from a fiber laser that is low cost, comparatively simple, and presents minimal risk to the doped fiber. More specifically, the present invention provides a method and apparatus for generating single polarization fiber output by which a tightly looped fiber grating reflector is formed within the fiber laser itself. As noted above, a fiber grating has natural birefringence. This birefringence creates a differential loss between the two available polarizations. The present invention permits formation of this grating within a single fiber, and thus no splicing between components is required. The differential loss between the polarizations is further accentuated by tight looping of the fiber at the grating site. A modified technique is utilized for writing the Bragg grating within the fiber which, unlike currently used procedures, does not require the step of stripping the outer coating and the step of exposing the fiber to high intensity pulsed ultraviolet light, both of which mechanically weaken the fiber. Thus, upon formation of the grating, a loop can be created in the fiber without significant risk of breakage.

DETAILED DESCRIPTION OF THE INVENTION

The present invention is useful for providing a method and apparatus for generating single polarization laser output from a fiber optic laser. The following description is presented to enable one of ordinary skill in the art to make and use the invention, which may be incorporated in the context of a variety of applications. Various modifications to the preferred embodiment, as well as a variety of uses in different applications will be readily apparent to those skilled in the art. Notably, the general principles defined herein may be applied to other embodiments; thus, the present invention is not intended to be limited to the embodiments shown, but is to be accorded the widest scope consistent with the principles and novel features disclosed herein.

Figure 1:
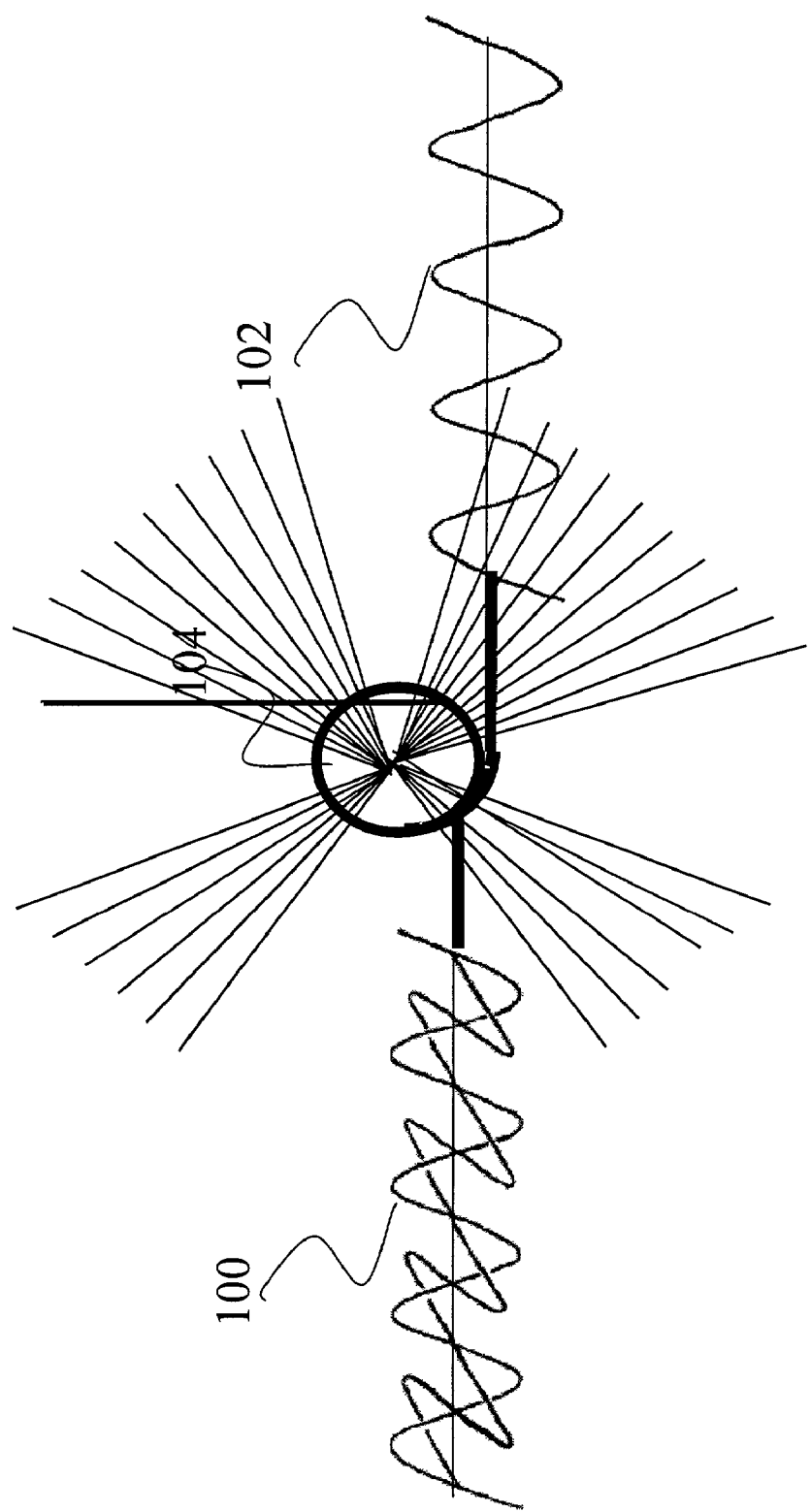
FIG. 1 illustrates the effects of creating a Bragg grating in a fiber laser and introducing a tight curve at the grating site on the polarization of the laser output.

In the present invention, the natural birefringence of the Bragg grating within the fiber laser serves to create a differential loss between the two polarizations of the laser output. In a preferred embodiment of this invention, the fiber laser is curved into a tight loop at the position of the grating. Tight curvature at the grating site serves to increase the differential loss between the two polarizations. FIG. 1 illustrates the affect of including a looped grating on the polarization of the laser output. Under ideal conditions, the natural output 100 of the fiber laser is converted essentially completely to a singularly polarized output 102 using a looped Bragg grating 104 according to the present invention.

The present invention takes advantage of a non-destructive technique for writing Bragg gratings within fiber lasers. Current procedures for writing gratings within fibers require first mechanically stripping the outer coating from the fiber followed by exposure to high power, pulsed far ultraviolet light (~244 nm). In a preferred embodiment of the present invention, the fiber is exposed instead to light in the 330 nm range. In this wavelength range, the polymer coating of the fiber is transparent and thus can remain intact. Furthermore, exposure at this wavelength takes advantage of the photosensitivity window of the fiber core, which is centered at 330 nm.

Figure 2:
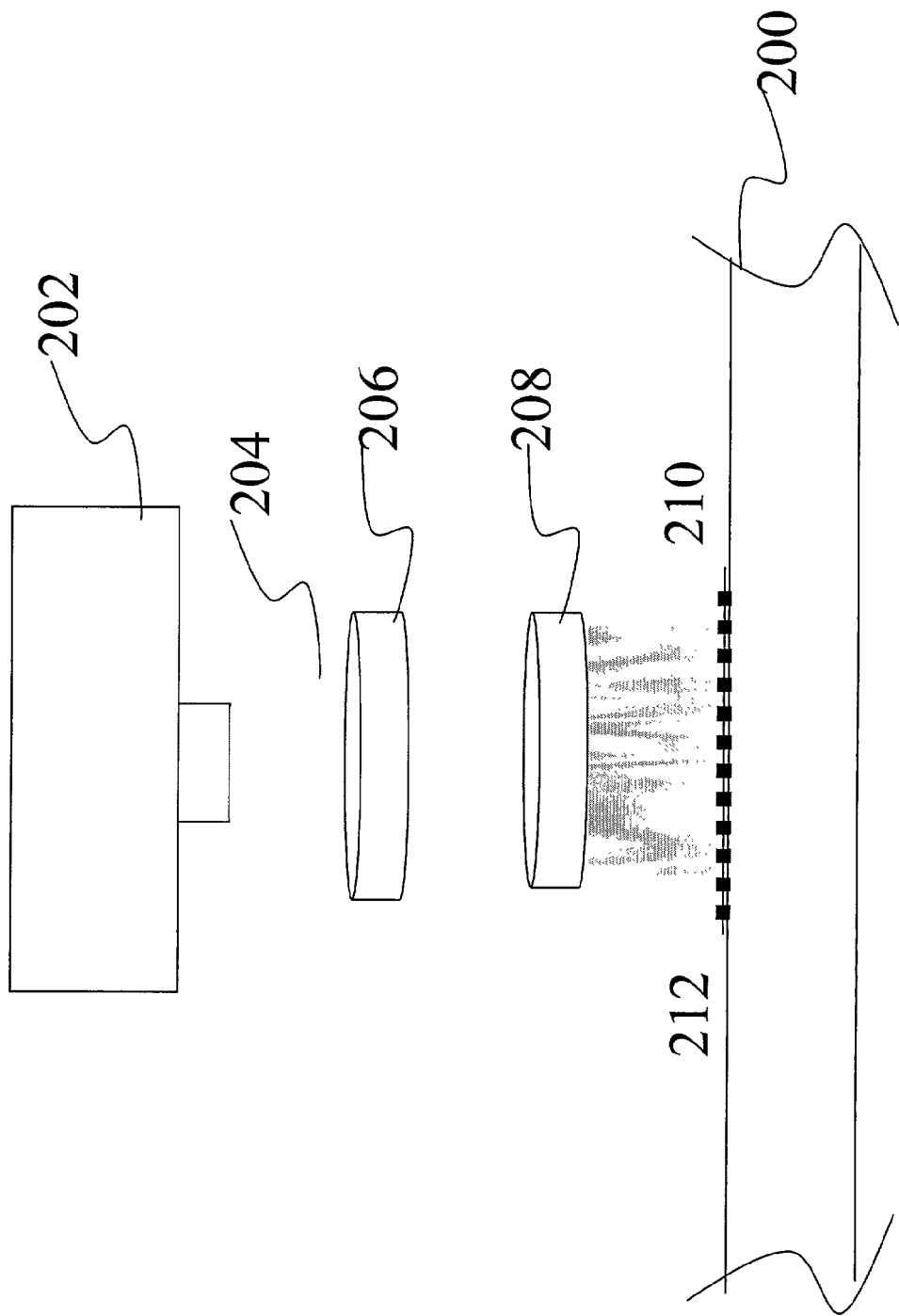
FIG. 2 depicts a non-destructive method for creating a Bragg grating in a fiber laser in order to polarize the laser output.

An example of a method for polarizing the output from a fiber laser according to the present invention is shown in FIG. 2. In this preferred embodiment of the present invention, Bragg gratings are fabricated in a neodymium-doped fiber 200 with ~20 mole percent germanium oxide in the core using the 334-nm line of a continuous wave argon laser 202. Laser writing power is 50–200 mW. The laser beam 204 is expanded by a cylindrical lens 206 to approximately 1.5 cm, and a second cylindrical lens 208 with focal length ~3 cm focuses the beam onto the fiber core. A phase mask 210 with period ~730 nm is placed in front of the fiber to impress a grating into the fiber core with a Bragg resonance at ~1060 nm. A thin (200-micron) glass slide 212 is placed between the fiber and the phase mask to protect the phase mask surface from possible debris from the polymer coating. As monitored using a halogen lamp light source and an optical spectrum analyzer, gratings having 10% Bragg intensity reflection can be obtained in 20 seconds to 2 minutes. The resultant grating can then be curved at the site of the grating to introduce differential loss between the available polarizations.

Figure 3:
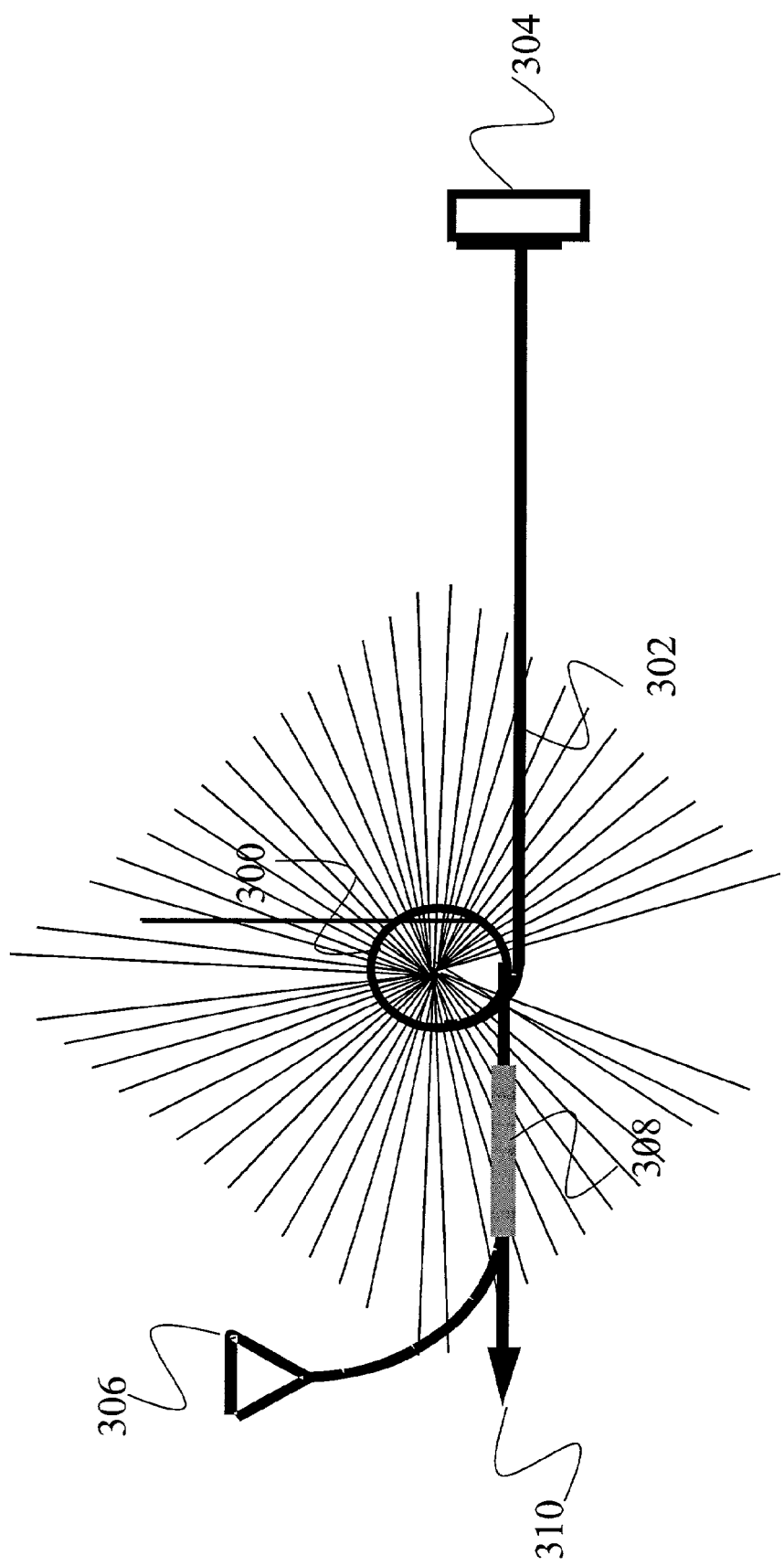
FIG. 3 depicts the utilization of the looped polarizer according to the present invention in a fiber laser.

An example of the utilization of the looped polarizer of the present invention is illustrated in FIG. 3. In this example, the Bragg grating 300 has 15% reflectivity and is written at one end of a 3 meter long neodymium fiber laser 302, and a 4% reflector 304 is positioned at the opposite end of the fiber. The laser system is coupled to a pump 306 through a coupler 308 at the same end of the fiber as the grating. In the present example, formation of a loop of approximately ¼" diameter at the grating site completely suppresses lasing in one polarization while maintaining it in the other as measured at the output site 310.

What is claimed is:

1. A method for generating single polarization output from a fiber laser comprising the steps of using a non-destructive technique to fabricate a Bragg grating within the fiber laser and forming the fiber laser at the grating position into a tight curve.

2. A method for generating single polarization output from a fiber laser as set forth in claim 1, wherein the fiber laser has a surface and the non-destructive technique for fabricating the grating comprises the steps of positioning a phase mask parallel to a length of the surface of the fiber laser and irradiating the phase mask and fiber laser with electromagnetic radiation.

3. A method for generating single polarization output from a fiber laser as set forth in claim 2, wherein the phase mask and fiber laser are irradiated with 334 nm electromagnetic radiation from a continuous wave argon laser.

4. A method for generating single polarization output from a fiber laser as set forth in claim 3, wherein the electromagnetic radiation from the argon laser is conditioned by at least one lens prior to irradiating the mask and fiber laser.

5. A method for generating single polarization output from a fiber laser as set forth in claim 2, wherein a glass slide is placed between the surface of the fiber laser and the phase mask during fabrication of the grating to protect the phase mask from debris from the surface of the fiber laser.

6. A method for generating single polarization output from a fiber laser as set forth in claim 1, wherein the tight curve formed at the grating position is a complete loop in the fiber laser.

7. A method for generating a single polarization output from a fiber laser as set forth in claim 1, wherein the fiber laser is a neodymium (Nd) doped fiber.

8. A method for generating single polarization output from a fiber laser as set forth in claim 1, wherein the irradiating step utilizes electromagnetic radiation between 320 nm and 340 nm.

9. An apparatus for generating single polarization output from a fiber laser comprising a Bragg grating fabricated within the fiber laser using a non-destructive technique and further comprising a tight curve formed in the fiber laser at the grating position.

10. An apparatus for generating single polarization output from a fiber laser as set forth in claim 9, wherein said fiber laser has a surface and said Bragg grating is fabricated by positioning a phase mask parallel to a length of the surface of the fiber laser and irradiating the phase mask and fiber laser with electromagnetic radiation.

11. An apparatus for generating single polarization output from a fiber laser as set forth in claim 10, wherein the grating is fabricated by irradiating the mask and fiber laser with 334 nm electromagnetic radiation from a continuous wave argon laser.

12. An apparatus for generating single polarization output from a fiber laser as set forth in claim 11, wherein the 334 nm electromagnetic radiation is conditioned by at least one lens prior to irradiating the mask and fiber laser.

13. An apparatus for generating single polarization output from a fiber laser as set forth in claim 10, wherein a glass slide is placed between the surface of the fiber laser and the phase mask during fabrication of the grating to protect the phase mask from debris from the surface of the fiber laser.

14. An apparatus for generating single polarization output from a fiber laser as set forth in claim 9, wherein the tight curve formed at the grating position is a complete loop in the fiber laser.

15. An apparatus for generating single polarization output from a fiber laser as set forth in claim 9, wherein the fiber laser is a neodymium (Nd) doped fiber.

16. An apparatus for generating single polarization output from a fiber laser as set forth in claim 9, wherein the fiber laser operates with electromagnetic radiation between 320 nm and 340 nm.

17. A method for obtaining a single polarization from a fiber laser comprising the acts of:
    fabricating a Bragg grating in the fiber laser non-destructively; and
    increasing a differential loss between two polarizations, wherein the act of increasing comprises the act of tightly looping the Bragg grating.

18. The method for obtaining a single polarization from a fiber laser as set forth in claim 17, wherein the fiber laser has a surface and the act of fabricating a Bragg grating comprises the acts of positioning a phase mask parallel to a length of the surface of the fiber laser and irradiating the phase mask and fiber laser with electromagnetic radiation.

19. The method for obtaining a single polarization from a fiber laser as set forth in claim 18, wherein the phase mask and fiber laser are irradiated with 334 nm electromagnetic radiation from a continuous wave argon laser.

20. The method for obtaining single polarization from a fiber laser as set forth in claim 19, wherein the electromagnetic radiation from the argon laser is conditioned by at least one lens prior to irradiating the mask and fiber laser.

21. The method for obtaining single polarization from a fiber laser as set forth in claim 18, wherein a glass slide is placed between the surface of the fiber laser and the phase mask during fabrication of the grating to protect the phase mask from debris from the surface of the fiber laser.

22. The method for obtaining single polarization from a fiber laser as set forth in claim 17, wherein the tight loop formed at the grating position is a complete loop in the fiber laser.

23. The method for obtaining a single polarization from a fiber laser as set forth in claim 17, wherein the fiber laser is a neodymium (Nd) doped fiber.

24. The method for obtaining a single polarization from a fiber laser as set forth in claim 18, wherein the act of irradiating utilizes electromagnetic radiation between 320 nm and 340 nm.

* * * * *